(12) United States Patent  (10) Patent No.: US 8,695,970 B2
Liao  (45) Date of Patent: Apr. 15, 2014

(54) MULTI-FUNCTION PERIPHERAL

(75) Inventor: Chia-Wu Liao, New Taipei (TW)

(73) Assignee: Kinpo Electronics, Inc., New Taipei (TW)

(*) Notice: Subject to any disclaimer, the term of this patent is extended or adjusted under 35 U.S.C. 154(b) by 0 days.

(21) Appl. No.: 13/530,115

(22) Filed: Jun. 22, 2012

(65) Prior Publication Data

US 2013/0147110 A1 Jun. 13, 2013

(30) Foreign Application Priority Data

Dec. 13, 2011 (TW) .............................. 100145950 A

(51) Int. Cl.
*B65H 1/00* (2006.01)
(52) U.S. Cl.
USPC .......................................... 271/171; 271/145
(58) Field of Classification Search
USPC ............... 271/171, 145, 152, 25, 31, 38, 130; 399/393, 23
See application file for complete search history.

(56) References Cited

U.S. PATENT DOCUMENTS

| 5,815,787 | A  | * | 9/1998 | Crayton et al. | 399/393 |
| 7,547,014 | B2 | * | 6/2009 | Okuda et al. | 271/171 |
| 7,913,998 | B2 | * | 3/2011 | Okuda et al. | 271/171 |
| 8,070,153 | B2 | * | 12/2011 | Kang | 271/164 |
| 2006/0244199 | A1 | * | 11/2006 | Marasco | 271/145 |
| 2007/0222140 | A1 | * | 9/2007 | Tsuchida | 271/171 |
| 2008/0308999 | A1 | * | 12/2008 | Takai et al. | 271/91 |
| 2009/0206544 | A1 | * | 8/2009 | Allwright | 271/145 |
| 2010/0025924 | A1 | * | 2/2010 | Rennick et al. | 271/207 |
| 2011/0291349 | A1 | * | 12/2011 | Nemura et al. | 271/145 |
| 2011/0298173 | A1 | * | 12/2011 | Wang | 271/128 |

* cited by examiner

*Primary Examiner* — Kaitlin Joerger
(74) *Attorney, Agent, or Firm* — Jianq Chyun IP Office

(57) ABSTRACT

A multi-function peripheral (MFP) including a machine body, a paper feeding cassette, and a sensing module is provided. The paper feeding cassette is assembled to the machine body, and multiple pieces of paper are suited for being stacked on a supporting surface of the paper feeding cassette. The sensing module includes a holder and a sensor. The holder is disposed at a side of the paper feeding cassette and capable of moving along a normal of the supporting surface. The sensor is disposed on the holder. A sensing surface of the sensor faces the supporting surface and keeps a distance from a top piece of the paper.

10 Claims, 6 Drawing Sheets

MULTI-FUNCTION PERIPHERAL

CROSS-REFERENCE TO RELATED APPLICATION

This application claims the priority benefit of Taiwan application serial no. 100145950, filed on Dec. 13, 2011. The entirety of the above-mentioned patent application is hereby incorporated by reference herein and made a part of this specification.

BACKGROUND OF THE INVENTION

1. Field of the Invention

The present invention generally relates to a multi-function peripheral (MFP), and in particular, to an MFP capable of detecting paper.

2. Description of Related Art

With the coming of the information society, office automation equipment, such as a scanner, a photocopier, and a printer, is set in offices, and a user can perform word processing operations by using the office automation equipment. It should be noted that when being configured in the office at the same time, the office automation equipment may occupy much space, causing a trouble of insufficient space in a small-space office. Therefore, an MFP integrating functions of photocopying, printing, and scanning is developed, so as to solve the above problem.

Generally speaking, to enable the MFP to confirm whether paper is placed into a paper feeding cassette before performing image processing (printing or scanning), a sensor is disposed in the paper feeding cassette. Moreover, to enable the MFP to perform corresponding image processing operation according to the size of the paper, another sensor is disposed at a carriage to recognize the kind of the paper fed into the paper feeding cassette. Therefore, the MFP can only implement the recognition procedure before image processing necessarily through the above sensors at two positions.

SUMMARY OF THE INVENTION

Accordingly, the present invention is directed to an MFP, which has a lower manufacturing cost.

An embodiment of the present invention provides an MFP, which includes a machine body, a paper feeding cassette and a sensing module. The paper feeding cassette is assembled to the machine body. Multiple pieces of paper are suited for being disposed on a supporting surface of the paper feeding cassette, and the sensing module includes a holder and a sensor. The holder is disposed at a side of the paper feeding cassette and capable of moving along a normal of the supporting surface. The sensor is disposed on the holder. A sensing surface of the sensor faces the supporting surface, and keeps a distance from a top piece of paper.

In an embodiment of the present invention, the paper feeding cassette includes a supporting tray and an adjustor. The supporting tray is assembled to the machine body. The adjustor is movably disposed on the supporting tray along a clamping axis to clamp the paper. The holder is disposed on the adjustor. The clamping axis is parallel to the supporting surface.

In an embodiment of the present invention, the adjustor has a supporting portion and a clamping portion. The supporting portion has the supporting surface. The clamping portion extends from the supporting portion in a direction opposite to the supporting surface, and leans against a side edge of the paper. The holder is coupled to the clamping portion slidably.

In an embodiment of the present invention, the holder includes a main body and at least one pair of hooks. The main body is coupled to the clamping portion slidably. The sensor is disposed on the main body. The hooks extend from the main body and are fastened to the clamping portion slidably.

In an embodiment of the present invention, the clamping portion is located between the main body and the hooks.

In an embodiment of the present invention, the main body is located above the paper, and the sensor is disposed on the main body.

In an embodiment of the present invention, the holder further includes a guiding portion extending from the main body and located between the sensor and the supporting portion. The paper is fed into the paper feeding cassette through the guiding portion and the supporting portion.

In an embodiment of the present invention, the guiding portion has a guiding slope and a leaning surface adjoined to each other. The leaning surface faces the supporting surface. An angle is included between the guiding slope and the leaning surface. The paper is fed into a space between the supporting surface and the leaning surface through the guiding slope.

In an embodiment of the present invention, the leaning surface leans against a top piece of the paper. The paper presses the holder to move in a direction away from the supporting surface.

In an embodiment of the present invention, the clamping portion has an opening and a first jointing portion. The first jointing portion is located at the opening and at a side away from the supporting portion. The holder further has a second jointing portion extending from the main body towards the clamping portion, so as to pass through the opening and be opposite to the first jointing portion.

In an embodiment of the present invention, the sensing module further includes an elastic part jointed between the first jointing portion and the second jointing portion. The paper presses the holder to compress the elastic part.

In an embodiment of the present invention, the sensor is an optical reflective sensor.

To sum up, in the embodiments of the present invention, the holder is disposed at a side of the paper feeding cassette and can move back and forth with respect to the supporting surface of the paper feeding cassette. Therefore, no matter how many pieces of paper are placed in the paper feeding cassette, the sensing surface of the sensor disposed on the holder still keeps a distance from a top piece of the paper. In this way, the sensor at the paper feeding cassette can achieve an effect of detecting whether the paper exists and the kind of the paper at the same time, thus effectively saving a cost of manufacturing multiple sensors.

To make the features and advantages of the present invention more comprehensible, the present invention is described in detail in the following with reference to the embodiments and accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
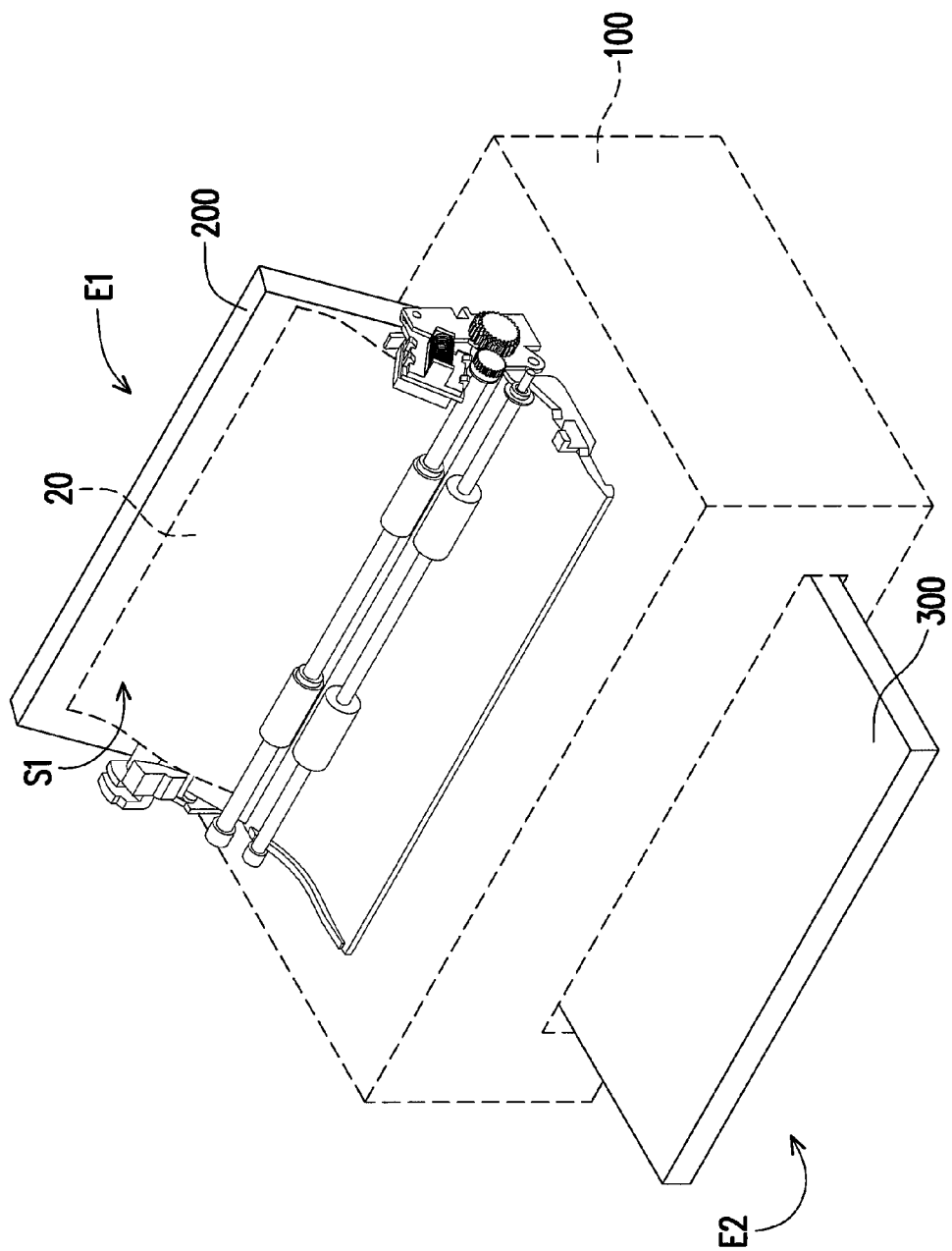
FIG. 1A is a schematic view of an MFP according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 1B:
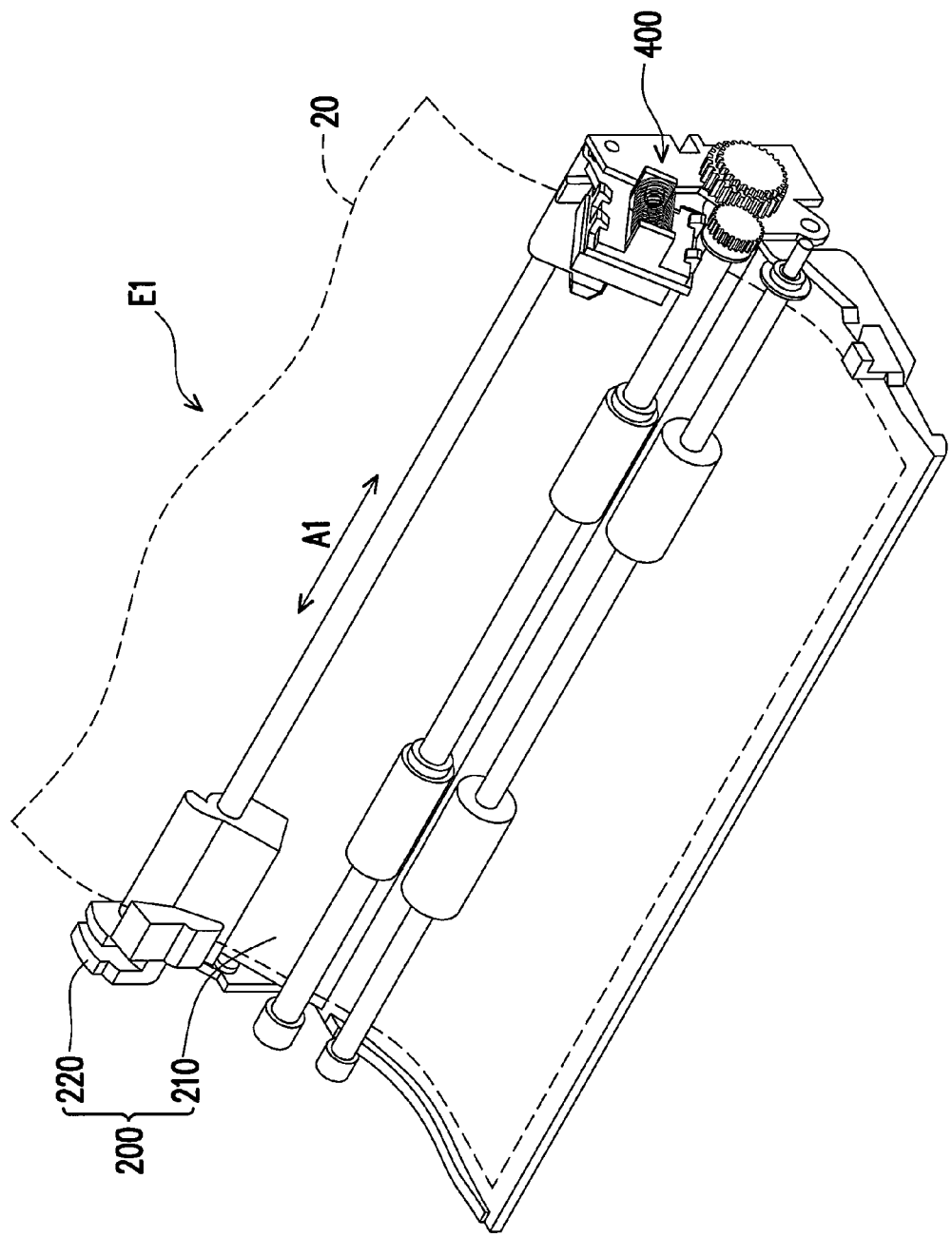
FIG. 1B is a partial enlarged view of the MFP in FIG. 1A.
Figure 2:
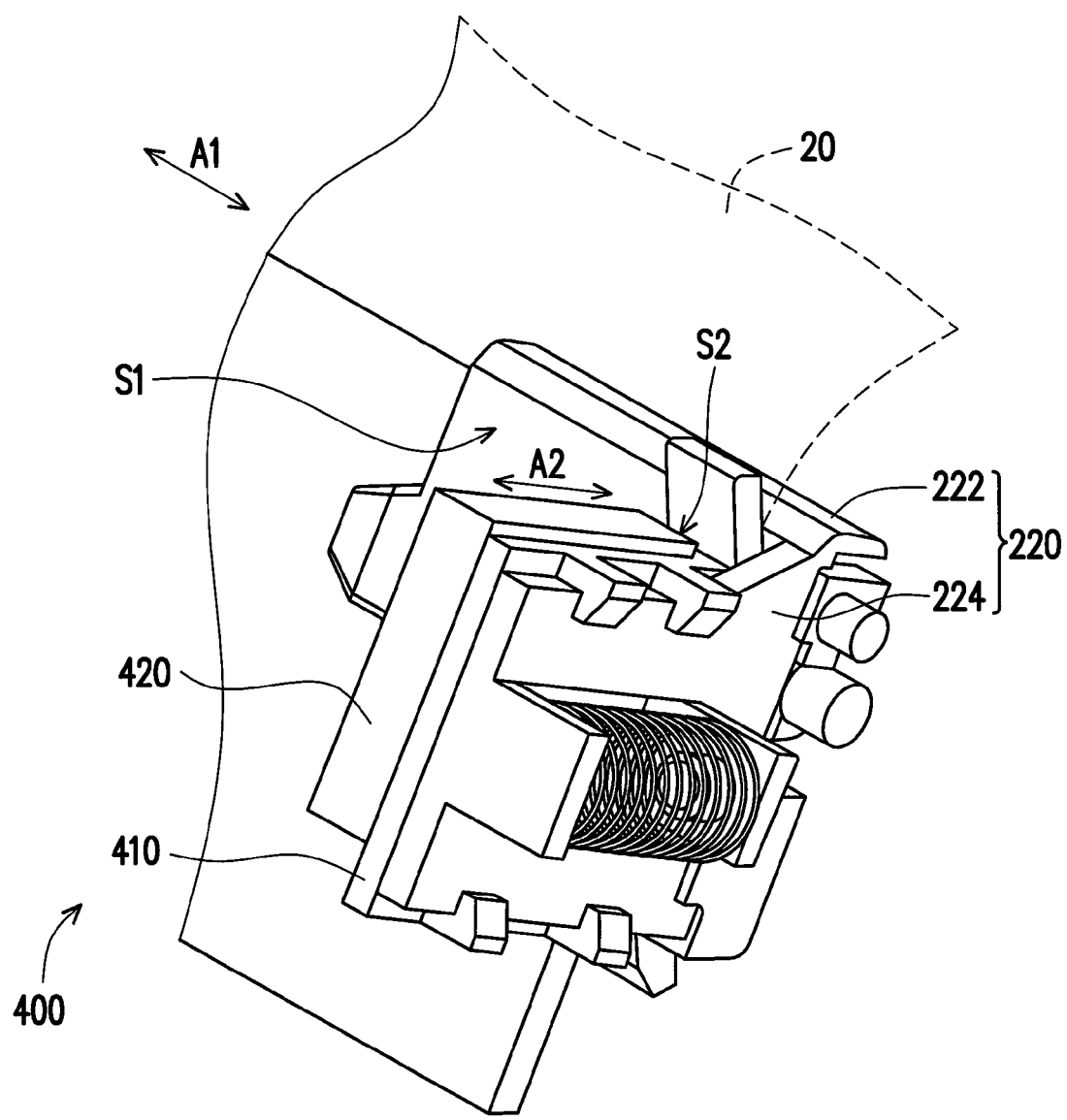
FIG. 2 is a partial enlarged view of the MFP in FIG. 1B.

FIG. 1A is a schematic view of an MFP according to an embodiment of the present invention; FIG. 1B is a partial enlarged view of the MFP in FIG. 1A; and FIG. 2 is a partial enlarged view of the MFP in FIG. 1B. Referring to FIG. 1A, FIG. 1B and FIG. 2, in order to clearly understand a structural feature of a paper feeding cassette of an MFP, a general shape of the MFP is shown in a dashed line in FIG. 1. In this embodiment, the MFP 10 includes a machine body 100, a paper feeding cassette 200, a paper delivery cassette 300 and a sensing module 400. The paper feeding cassette 200 and the paper delivery cassette 300 are respectively assembled to two opposite sides of the machine body 100, so as to form a paper feeding area E1 and a paper delivery area E2. Multiple pieces of paper 20 are suited for being disposed on a supporting surface S1 of the paper feeding cassette 200, so that the paper 20 is fed into the machine body 100 one by one and then is delivered out of the machine body 100 from the paper delivery area E2 after the corresponding image processing (printing or scanning) is performed. Here, the type of the MFP 10 is not limited, any type requiring using the above members for feeding and delivery of the paper 20 may all be applicable to the present invention.

In this embodiment, the paper feeding cassette 200 includes a supporting tray 210 and an adjustor 220, in which the supporting tray 210 is assembled to the machine body 100, and the adjustor 220 is movably disposed on the supporting tray 210 along a clamping axis A1, so as to adjust the width of paper 20 along the clamping axis A1 through clamping a side edge of the paper 20 (that is, aligning the paper 20). Here, the clamping axis A1 is parallel to the supporting surface S1.

On the basis of the above description, in order to enable the MFP 10 to operate smoothly, it is required to determine whether the paper 20 exists and recognize the kind of the paper 20 before printing (or scanning). Therefore, the sensing module 400 of this embodiment includes a holder 410 and a sensor 420, in which the holder 410 is disposed at a side of the paper feeding cassette 200 and capable of moving along a normal A2 of the supporting surface S1, and the sensor 420 is, for example, an optical reflective sensor, and is disposed on the holder 410. A sensing surface S2 of the sensor 420 faces the supporting surface S1, and after multiple pieces of paper 20 are fed into the paper feeding cassette 200, the sensor 420 emits light to the paper 20, senses reflective light returned from the paper 20, and then determines whether paper 20 exists in the paper feeding cassette 200 and meanwhile recognizes the kind of the paper 20. A light sensing distance of the sensor 420 needs to keep in an effective operation range, so the sensing surface S2 of the sensor 420 needs to keep a distance from a top piece of the paper 20.

Therefore, in this embodiment, the holder 410 can move back and forth along a normal A2 of the supporting surface S1 with respect to the adjustor 220 and the supporting tray 210, so that the sensing surface S1 keeps a fixed distance from the top piece of the paper 20 no matter how many pieces of paper 20 are fed into the paper feeding cassette 200, that is, with the increasing of the paper 20 fed into the paper feeding cassette 200, the holder 410 can also increase the distance from the supporting surface S1. In this way, one sensing module 400 disposed at the paper feeding cassette 200 can achieve an effect of judging whether the paper 20 exists and recognizing the kind of the paper.

Figure 3:
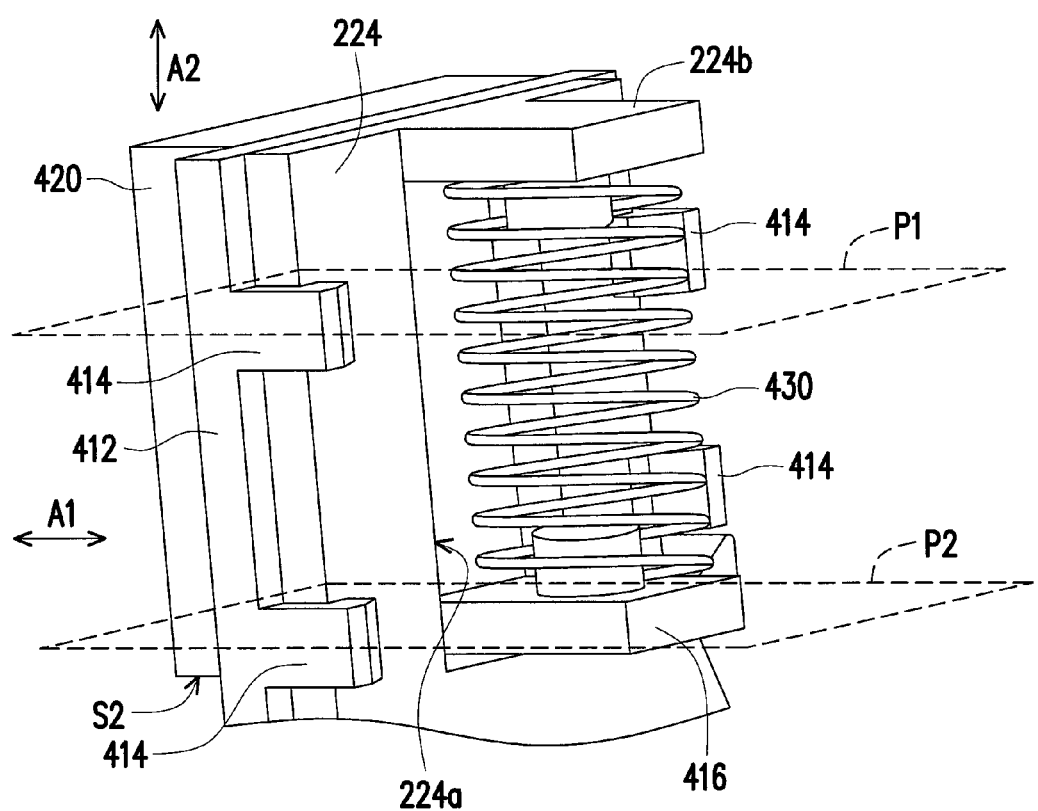
FIG. 3 and FIG. 4 illustrate partial components of the MFP in FIG. 1 from different viewing angles respectively.
Figure 4:
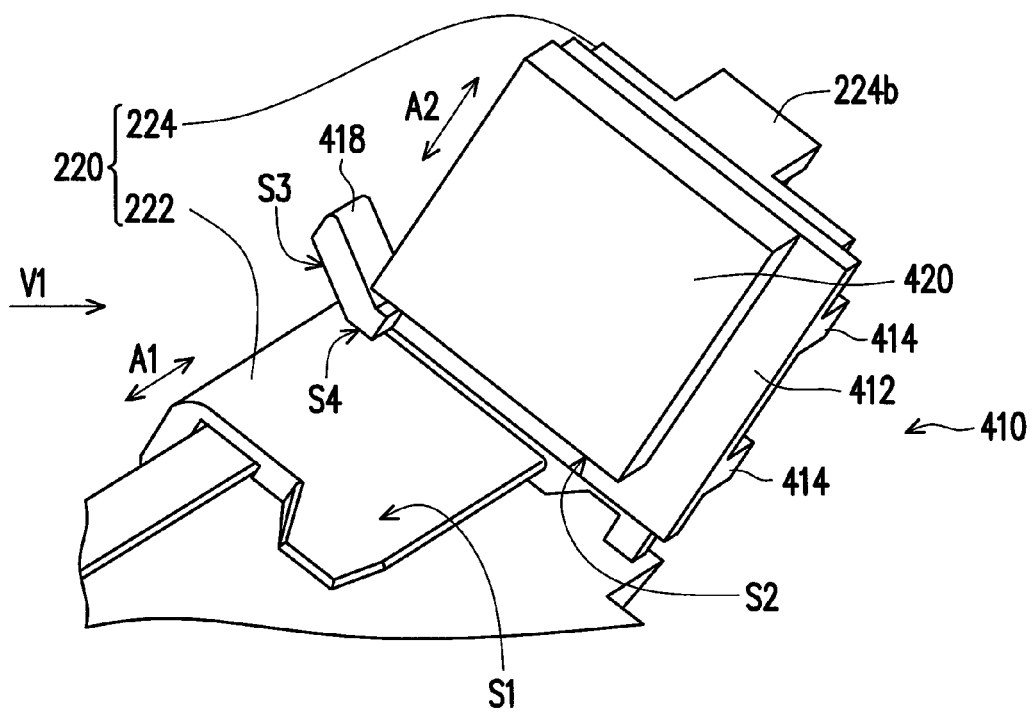
Figure 5:
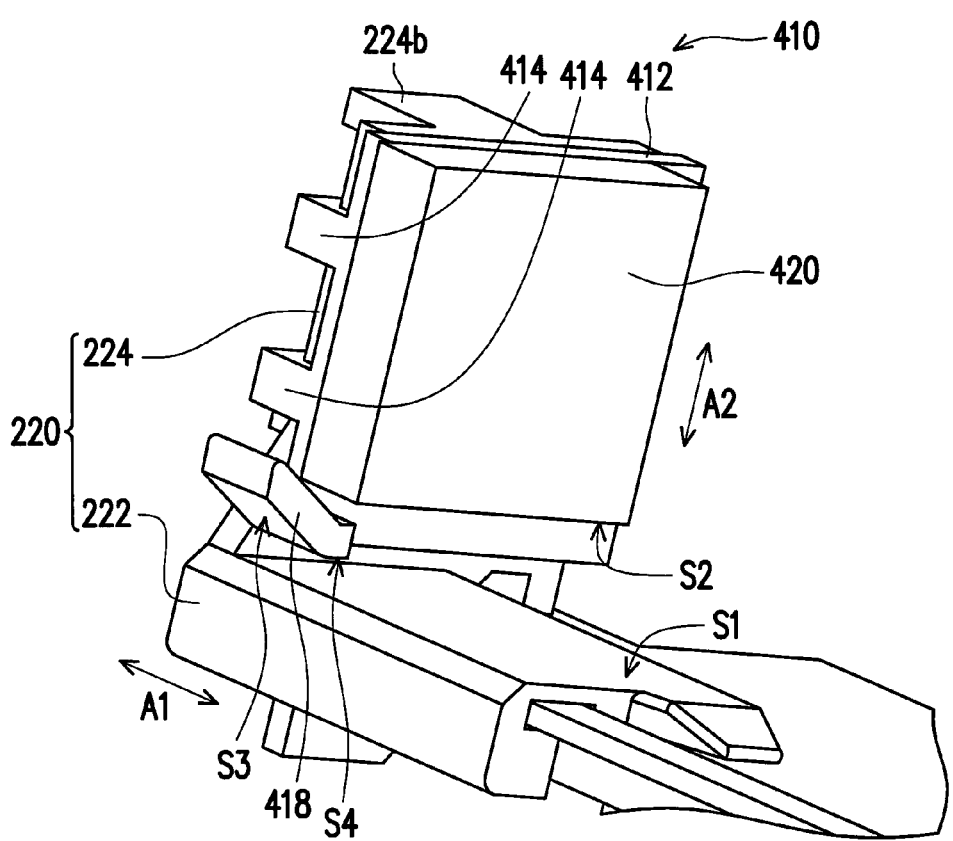
FIG. 5 is a side view of a sensing module in FIG. 4 from a viewpoint V1.
Figure 6:
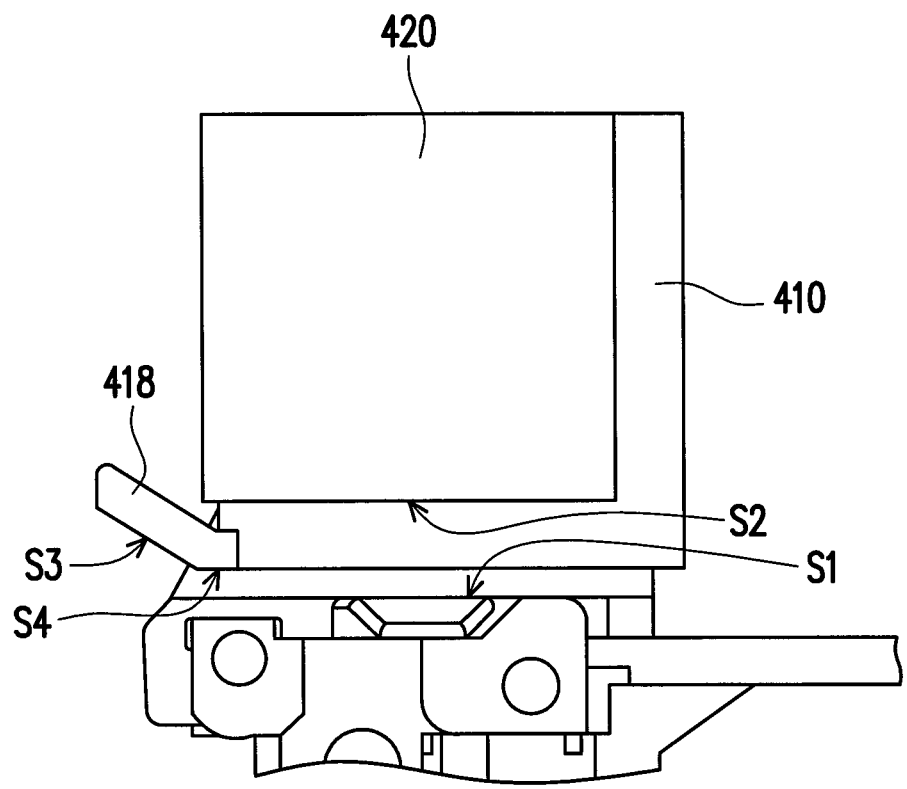
FIG. 6 is a side view of a sensing module in FIG. 4 from a viewpoint V2.

Specifically, FIG. 3 and FIG. 4 illustrate partial components of the MFP in FIG. 1 from different viewing angles respectively; FIG. 5 is a side view of a sensing module in FIG. 4 from a viewpoint V1; and FIG. 6 is a side view of a sensing module in FIG. 4 from a viewpoint V2. Referring to FIG. 3 to FIG. 6, in this embodiment, the adjustor 220 has a supporting portion 222 and a clamping portion 224, in which the supporting portion 222 has the supporting surface S1, and the clamping portion 224 extends from the supporting portion 222 and with the back to the supporting surface S1, that is, the clamping portion 224 extends along a normal A2 of the supporting surface S1 and in a direction opposite to the supporting surface S1, so that the clamping portion 224 can lean against a side edge of the paper 20 along a clamping axis A1.

In addition, the holder 410 includes a main body 412 and two pairs of hooks 414. The main body 412 is coupled to the clamping portion 224 slidably. The hooks 414 in pairs opposite to each other are located on two planes P1 and P2 parallel to the supporting surface S1, extend from two opposite sides of the main body 412 towards the clamping portion 224, and are fastened to a side of the clamping portion 224 back to the paper 20 slidably. The sensor 420 is disposed on a side of the main body 412 back to the clamping portion 224. In other words, the hooks 414 of this embodiment are merely used to limit the degree of freedom (DOF) of the holder 410 along the clamping axis A1, that is, the main body 412 and the hooks 414 form a structure similar to a track, so as to enable the clamping portion 224 to be coupled between the main body 412 and the hooks 414, so that the main body 412 can move back and forth along the normal A2 of the supporting surface S1.

In this embodiment, the clamping portion 224 has an opening 224a and a first jointing portion 224b, in which the opening 224a extends along the normal A2 of the supporting surface S1, and the first jointing portion 224b is located at the opening 224a and away from the supporting portion 222. The holder 410 further has a second jointing portion 416 extending from the main body 412 towards the clamping portion 224 to pass through the opening 224a, and the second jointing portion 416 is opposite to the first jointing portion 224b with the opening 224a disposed therebetween. In this way, the holder 410 and the clamping portion 224 form a sliding structure engaged with each other, that is, through the moving of the second jointing portion 416 along the extending direction of the opening 224a (the normal A2) towards the first jointing portion 224b, the holder 410 can move back and forth along the normal A2 of the supporting surface S1 with respect to the clamping portion 224. Here, the number of the hooks and the relative sliding structure of the holder 410 and the clamping portion 224 are not limited.

In addition, the holder 410 located above the paper 20 further has a guiding portion 418, and the guiding portion 418 extends from the main body 412 and is located between the sensor 420 and the supporting portion 222. When a user is about to put the paper 20 into the paper feeding cassette 200, the paper 20 is fed into the paper feeding cassette 200 through the guiding portion 418. Further, the guiding portion 418 has a guiding slope S3 and a leaning surface S4 adjoined to each other, in which the leaning surface S4 faces the supporting surface S1, and an angle is included between the guiding slope S3 and the leaning surface S4, so the paper 20 is first fed into a space between the supporting surface S1 and the leaning surface S4 through the guiding slope S3 and then stacked on the supporting surface S1.

On the other hand, the sensing module 400 further includes an elastic part 430 jointed between the first jointing portion 224b and the second jointing portion 416. The elastic part 430 is, for example, a compression spring, and is compressed along the normal A2 of the supporting surface S1, so as to drive the holder 410 to move towards the supporting surface S1 of the paper feeding cassette 200 through the elasticity. In other words, the holder 410 of the sensing module 400 enables the leaning surface S4 to always press the top piece of the paper 20 through the elasticity of the elastic part 430. It should be noted that, the supporting surface S1 is used as a reference standard to describe the top piece of the paper 20 herein.

Correspondingly, when the quantity of the paper 20 in the paper feeding cassette 200 increases, the paper 20 may also drive the leaning surface S4 of the guiding portion 418 in a reverse direction (a direction opposite to the supporting surface S1), so that the second jointing portion 416 moves towards the first jointing portion 224b and compresses the elastic part 430 (that is, enabling the holder 410 and the sensor 420 disposed thereon to keep away from the supporting surface S1). Therefore, the sensor 420 disposed on the holder 410 can be driven by the holder 410, and moves away from the supporting surface S1 or towards the supporting surface S1 in the paper feeding cassette 200 with the increasing or decreasing of the quantity of the paper 20, so that the sensing surface S2 of the sensor 420 keeps a fixed distance from the top piece of the paper 20 in the paper feeding cassette 200, in which the fixed distance is the distance between the sensing surface S2 and the leaning surface S4 of the holder 410.

To sum up, in the embodiments of the present invention, the holder is disposed at a side of the paper feeding cassette and can move back and forth with respect to the supporting surface of the paper feeding cassette. Therefore, no matter how many pieces of paper are placed in the paper feeding cassette, the sensing surface of the sensor disposed on the holder still keeps a distance from a top piece of multiple pieces of the paper. In this way, the sensor at the paper feeding cassette can achieve an effect of detecting whether the paper exists and the kind of the paper at the same time, thus effectively saving a cost of manufacturing multiple sensors.

The technical content of the present invention has been disclosed through preferred embodiments, but is not intended to be limited thereto. Various variations and modifications made by persons skilled in the art without departing from the spirit of the present invention fall within the scope of the present invention as defined by the appended claims.

What is claimed is:

1. A multi-function peripheral (MFP), comprising:
a machine body;
a paper feeding cassette, assembled to the machine body, wherein multiple pieces of paper are suited for being stacked on a supporting surface of the paper feeding cassette, wherein the paper feeding cassette comprises:
a supporting tray, assembled to the machine body; and
an adjustor, movably disposed on the supporting tray to clamp the paper along a clamping axis, wherein the clamping axis is parallel to the supporting surface; and
a sensing module, comprising:
a holder, disposed on the adjustor, located at a side of the paper feeding cassette and capable of moving along a normal of the supporting surface; and
a sensor, disposed on the holder, wherein a sensing surface of the sensor faces the supporting surface, and keeps a distance from a top piece of paper, such that the sensor detects that whether the paper exists and the kind of the paper,
wherein the adjustor comprises a supporting portion and a clamping portion, the supporting portion comprises the supporting surface, the clamping portion extends from the supporting portion and with the back to the supporting surface and leans against a side edge of the paper, and the holder is slidably coupled to the clamping portion.

2. The MFP according to claim 1, wherein the holder comprises:
a main body, slidably coupled to the clamping portion, wherein the sensor is disposed on the main body; and
at least one pair of hooks, extending from the main body and slidably fastened to the clamping portion.

3. The MFP according to claim 2, wherein the clamping portion is located between the main body and the pair of hooks.

4. The MFP according to claim 2, wherein the main body is located above the paper, and the sensor is disposed on the main body.

5. The MFP according to claim 2, wherein the holder further comprises:
a guiding portion, extending from the main body and located between the sensor and the supporting portion, wherein the paper is fed into the paper feeding cassette through the guiding portion and the supporting portion.

6. The MFP according to claim 5, wherein the guiding portion comprises a guiding slope and a leaning surface adjoined to each other, the leaning surface faces the supporting surface, an angle is included between the guiding slope and the leaning surface, and the paper is fed into a space between the supporting surface and the leaning surface through the guiding slope.

7. The MFP according to claim 6, wherein the leaning surface leans against a top piece of the paper, and the paper presses the holder and moves away from the supporting surface.

8. The MFP according to claim 2, wherein the clamping portion comprises an opening and a first jointing portion, the first jointing portion is located at the opening and at a side away from the supporting portion, and the holder further comprises a second jointing portion extending from the main body towards the clamping portion to pass through the opening and to be opposite to the first jointing portion.

9. The MFP according to claim 8, wherein the sensing module further comprise an elastic part, jointed between the first jointing portion and the second jointing portion, and the paper presses the holder to compress the elastic part.

10. The MFP according to claim 1, wherein the sensor is an optical reflective sensor.

* * * * *